(12) United States Patent
Bourgault

(10) Patent No.: US 9,081,490 B2
(45) Date of Patent: Jul. 14, 2015

(54) APPARATUS AND METHOD FOR OVERLAYING TOUCH-SCREEN INPUT WITH DIGITAL DISPLAY OF AN NDT/NDI INSTRUMENT

(75) Inventor: Sylvain Bourgault, Quebec (CA)

(73) Assignee: OLYMPUS SCIENTIFIC SOLUTIONS AMERICAS INC., Waltham, MA (US)

( * ) Notice: Subject to any disclaimer, the term of this patent is extended or adjusted under 35 U.S.C. 154(b) by 492 days.

(21) Appl. No.: 13/524,483

(22) Filed: Jun. 15, 2012

(65) Prior Publication Data

US 2013/0338960 A1    Dec. 19, 2013

(51) Int. Cl.
*G06F 3/0488* (2013.01)
*G09G 5/377* (2006.01)
*G06F 9/44* (2006.01)
*G06F 9/445* (2006.01)

(52) U.S. Cl.
CPC ............. *G06F 3/0488* (2013.01); *G06F 9/4443* (2013.01); *G06F 9/44505* (2013.01); *G09G 5/377* (2013.01)

(58) Field of Classification Search
CPC ..... G06F 3/041; G06F 3/0416; G06F 3/0488; G06T 7/002; G06T 2207/10048; G09G 5/377
USPC .................. 702/122, 103, 188; 345/156, 173; 382/141, 152
See application file for complete search history.

(56) References Cited

U.S. PATENT DOCUMENTS

| 6,266,685 B1 * | 7/2001 | Danielson et al. ............ 708/141 |
| 6,795,784 B1 * | 9/2004 | Shepard ......................... 702/82 |
| 2009/0256817 A1 * | 10/2009 | Perlin et al. ................... 345/174 |

\* cited by examiner

*Primary Examiner* — Toan Le
(74) *Attorney, Agent, or Firm* — C. Tricia Liu

(57) ABSTRACT

A system and method for overlaying, combining or connecting touch-screen input either in free-form or fixed form, with NDT/NDI inspection information. The resulting user interface functionality for digital NDT instrument allows users to make touch-screen input in unrestricted or restricted format and later review and analyze the touch screen input in a complete context of an inspection session such as timing, waveform and geometric information of a defect or measurement target.

15 Claims, 5 Drawing Sheets

APPARATUS AND METHOD FOR OVERLAYING TOUCH-SCREEN INPUT WITH DIGITAL DISPLAY OF AN NDT/NDI INSTRUMENT

FIELD OF THE INVENTION

The present invention relates to non-destructive testing and inspection (NDT/NDI) and more particularly to a method of improving user interface functionality of NDT/NDI instruments by employing overlaying process combining hand-drawn information on a touch-screen with digital inspection data acquired from a NDT/NDI process.

BACKGROUND OF THE INVENTION

The measurement data from NDT/NDI instruments used for the routine monitoring of structural integrity must be sufficiently accurate to allow a valid assessment to be made on the condition of the structure under test. Examples of such structures are pipes and vessels which are widely used in the petrochemical and other industries. Examples of measurement or inspection data are pipe wall thickness and other geometric conditions, including, but not limited to, the presence of irregularities (e.g. corrosion, oxidation, etc.) and flaws (e.g. porosity, cracks, etc.).

Presently, some advanced NDT inspection instruments are equipped with graphical display, touch sensitive display (touch screen) and keyboard. In these instruments, touch sensitive displays are often used as a versatile keyboard by displaying virtual keys, which can be activated upon being pressed. Although it represents some major improvements by using these existing touch-screen-enabled instruments, however, in many cases, input methods allowed for users are limited to predefined formats. When this is the case, users cannot make input that does not respect the predefined formats. Most of time, these formats are alpha numeric and are entered by means of a keyboard and/or keys.

Another major drawback of these existing touch-screen enabled NDT/NDI instruments is that information being entered via touch screen is not correlated with graphical display of digital inspection data, limiting the usefulness of the touch screen input.

In NDT applications, one of the most import aspects of user interest is on the graphical display of inspection data, which is often generated based on digitized inspection data. It describes an inspected subject and some particularities of its condition. This information is only valid in a precise context and timing of an inspection session for a precise subject, which together with the acquired inspection data, forms a complete context of the inspection.

When the inspection data is saved in a media for later processing, the user would need this complete inspection context to be able to process, analyze and/or interpret the inspection data. It is a common practice that the user needs to identify the precise context associated with the specific inspection for later reference.

When using digital NDT inspection instruments equipped with graphical display, there are a lot of details and information presented to the user. This is currently available however not convenient to use in most of existing digital NDT inspection instruments. Particularly, it is not always easy, fast and practical for a user to identify and describe a precise element of information displayed on a graphical display and to make notes by using the existing of alpha numeric input formats provided by either touch screen virtual buttons or keyboards.

The specific challenge herein dealt with is to provide a method of combining touch screen (free form) user input information with the information acquired from digital inspection for the specific timing, geometry and context of the inspection session. This will ameliorate the cumbersome maneuvers of virtual or keyboard buttons.

Existing efforts related to usage of touch screen are found in some patents as follows.

U.S. Pat. No. 6,266,685B1 discloses a mechanical apparatus that can be employed for usage of a stylus in a handheld application. It does not address the type of information that is allowed to be entered or the link between the stylus entered information and other information available in the instrument.

Patent US20090256817A1 concerns more of a technology enabling the touch screen to sense pressure or touch more effectively and communicate the touch screen input accurately to the processor. It does not deal with providing a solution to link the touch-screen input with specific inspection information.

Patent WO2003090097A1 teaches a system that receives hand written information and transfers this information to some other system by means of an email.

As can be seen, existing efforts do not provide a solution of overlaying, combining or connecting hand-drawn touch-screen input with information acquired from inspection. Accordingly, a solution is much needed to overcome the drawbacks presented by existing touch-screen NDT/NDI instruments which require fixed-form touch screen input and/ or do not provide compounded display of the touch-screen input and the inspection information.

SUMMARY OF THE INVENTION

Accordingly, it is an objective of the present invention to provide a system and method for overlaying, combining or connecting free-form touch-screen input with NDT/NDI inspection information. The resulting user interface functionality for digital NDT instruments allows users to make touch-screen input and later review and analyze the touch screen input in a complete context of an inspection session such as timing, waveform and geometric information of a defect.

It is another objective of the present invention to provide an instrument and method that allows the user make free-form hand notes or drawings directly on a touch sensitive display of the instrument and then gives the user an option to overlay the hand-drawing information with the digital inspection display already available in the instrument.

Yet it is another objective of the present invention to provide an instrument and method that allows the user to make touch screen input in both free-form or pre-fixed formats then overlays the input in both formats with the specific digital inspection result.

The foregoing and other objectives of the invention are realized with a non-destructive instrument configured according to the present disclosure.

In accordance to various embodiments of the system and method of the present disclosure presents the advantages for interface functionality which significantly improves the versatility and efficiency of the usage of NDT/NDI instruments. Other advantages include the improvements in the usability of inspection data.

Other features and advantages of the present invention will become apparent from the following description of the invention that refers to the accompanying drawings.

DETAILED DESCRIPTION OF THE INVENTION

Figure 1:
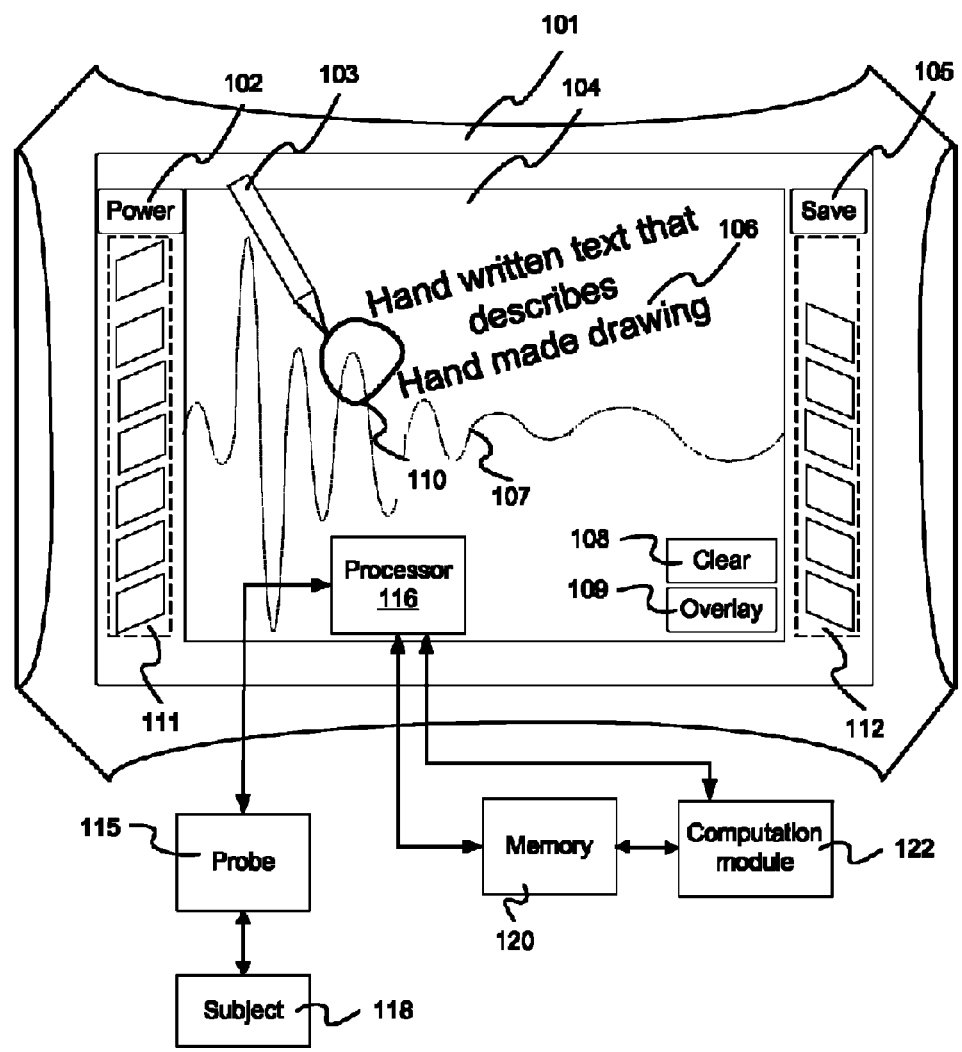
FIG. 1 is a schematic diagram showing an NDT instrument with a touch-screen and display overlay feature according to the presently disclosed invention.

It should be noted that the term 'real-time measurement' is used in the present disclosure to mean the immediate measurement result provided to the user or external device by measurement device 101 (FIG. 1). The measurement result may be provided to the user by means of display 104 (FIG. 1). The measurement result may be comprised of, but not limited to, graphical display, such as waveforms or numerical values representing thickness, defects, damages or flaws of various kinds and/or an alarm indication.

The present invention is now described hereinafter with reference to the accompanying drawings, in which some examples of the embodiments of the inventions are shown. Indeed, these inventions may be embodied in many different forms and should not be construed as limited to the embodiments set forth herein; rather, these embodiments are provided by way of example so that this disclosure will satisfy applicable legal requirements. Like numbers refer to like elements throughout.

FIG. 1 illustrates schematically a digital NDT inspection instrument 101 in which an embodiment of the present invention is included. Instrument 101 is equipped with a touch sensitive graphic display 104. It is also equipped with other user interface input and output means such as like a keypad 111, another keypad on the right side 112, a power key 102 and a stylus 103, which all can be part of an existing NDT instrument. Further included in the preferred embodiment are a save key 105, an "overlay" virtual key 109 and a "clear" virtual key 108, which represent one of the novel aspects of the preferred embodiment.

It can be appreciated that the keypads and arrangement of keypads shown in FIG. 1 and as described above are only one example of many possible forms. Variations in them do not affect the scope of the present disclosure.

A probe 115 is connected to the instrument for performing predetermined inspection on a test object 118. Probe 115 can be configured to provide output signal. The nature of the probe, probe signals or test object does not affect how the preferred embodiment works in this disclosure. Instrument 101 preferably transforms the signal returned by the probe from its original input, mostly in an analog form, to a digitalized form. The digitalized signal is then processed and plotted by instrument 101 as inspection result 107 which is displayed on the touch sensitive graphical display 103.

Similar to some conventional NDT/NDI instrument, 101 can be configured to control some characteristic of the output signal and the preference of the characteristics of the digitized signals and the content of the display. The exemplary waveform 107 shown in FIG. 1 is of a typical digitized ultrasonic echo signal which, under typical inspection sessions, changes versus time and refreshes automatically at a predetermined data display rate.

Continuing with FIG. 1, according to the preferred embodiment, if the operator notices a flaw or anything that warrant a more detailed future analysis on waveform 107, the operator might choose to pause or freeze the display so that it does not refresh at the normal display rate. The capability of freezing a display is provided by many existing NDT instrument. One of the novel aspects of present invention is to allow the operator to enter touch-screen information (herein as "touch-screen input") on top of the frozen waveform on the touch sensitive graphical display 104 and to overlay the information contained in the touch-screen input with the digital information represented by waveform 107. The touch-screen input can be of free-form, or in a pre-fixed form, such as being tabbed in a predetermined form shown on screen. The capability allows the touch-screen input to be placed in the complete context of the inspection session, including the instant status of the waveform, the location of the particular concern, the geometry of the test object, etc.

Instrument 101 further comprises a computation module 122, which is preferably loaded on a digital processor 116. Computation module 122 functions to process the touch screen input, perform overlay requirement and providing overlay display as requested by the operator. Module 122 can be a block of stand-alone software or firmware, or, most preferably is a part of the conventional data processing of NDT instrument 101. Instrument 101 further comprises a memory 120 which can be a detachable external memory or a part of the existing memory of instrument 101.

It can be appreciated by those skilled in the art that computation module 122 is preferably loaded on and executable by processor 116. Processor 116 and memory 120 are preferably assembled on a circuit board, which is together enclosed within instrument 101. In order not to block display 104 and other display features, memory 120 and the computation module 122 are placed outside the instrument in FIG. 1 only for illustrative reasons.

Before continuing with the further disclosure, it should be noted that FIG. 1 should still be continuously referred back when reference is made to other figures.

Figure 2:
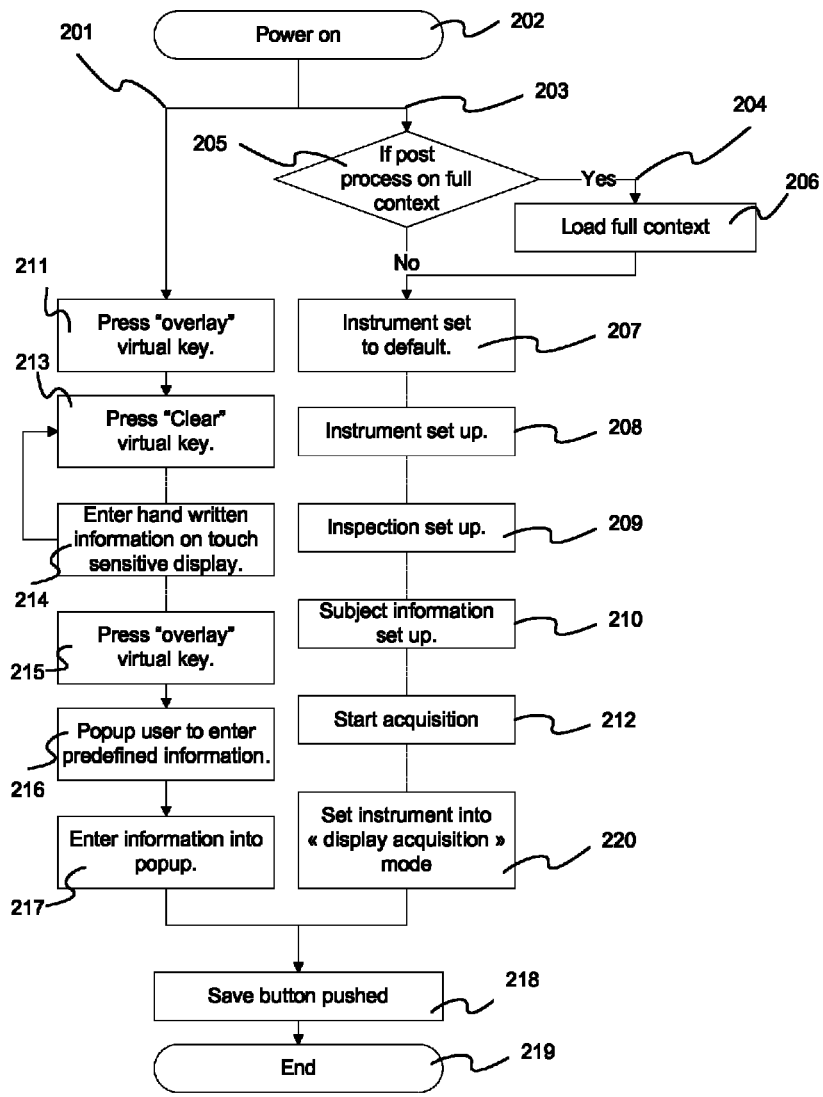
FIG. 2 is a flowchart diagram describing software modules or steps enabling the touch-screen input and display overlay in the preferred embodiment.

Reference now is made to FIG. 2, which illustrates a process or steps involved in operating the instrument embodying the touch sensitive display (104) and the novel configuration for overlaying the touch-screen input with inspection results according to the present disclosure. As can be appreciated, the steps herein presented are exemplary for illustrating purpose. Alternative steps associated with some specific types of NDT instruments can be employed within the scope of the present disclosure.

As shown in FIG. 2, there are two main branches of steps, one led by steps 201 to the left-hand and the other led by step 203 to the right-hand, with the former relates more to the usage of making touch-screen input, the latter relates to existing instrument functions, respectively; however, both branches are necessary to make use of the embodiment according to the present disclosure. It should be noted that the steps or process in the two branches are independent steps and there's no definitive relationship in timing-wise between one and another. In another word, the steps related to touch-screen input and overlaying can be interjected at any point, before, during or after an inspection session. In addition, steps to the right hand side can vary from one particular operation to another.

As for each new inspection or inspection review session, at step 202, instrument 101 is powered on. The user has a choice to load a complete context of one of the past inspections, which includes the information of a specific inspection setup, information on the object being inspected and the inspection results. If the user decides not to load a past inspection, the user needs to start a new inspection to gather inspection data to process. At step 207, instrument 101 can be initialized to default (207). Step 207 can be executed by the user or automatically. It can also be optional. Initialization to default will set inspection complete context to a default state.

Similar to the experience of using many existing NDT instruments, user can manually modify some inspection parameters in the instrument. These parameters can be included in instrument setup 208 or being modified in step 209. They can also be included in the step for setting up subject information and modified by step 210 which is optional depending from inspection to inspection.

Again, similar to any existing digital NDT instrument, presently disclosed instrument 101 can be configured to control some characteristic of the outputted signal and some characteristics of the digitalization of the altered signal. In step 209, these configurable parameters can be grouped together and named "Inspection setup".

To acquire new inspection data, the instrument is set in acquisition state or to manually start the acquisition at step 212. This step could be optional if the instrument is set to acquisition state by default at step 207.

Still referring to FIG. 2, attention is now turned to the process of making touch-screen input and overlaying such information with the inspection result obtained either at step 206 or 220.

One novel aspect of the embodiment in the present disclosure includes an "overlay mode" configured for instrument 101. Before, during or after an inspection session, the user can initialize the overlay mode in step 211 at anytime by pressing a button or virtual key, such as overlay virtual key 109. It should be noted that, without initializing the overlay mode, the user can preferably sketch any information on the touch screen 104; however the information will not be saved or overlaid until the user initialize the overlay mode by pressing overlay virtual key 109 (shown in FIG. 1). After the overlay mode is initialized, touch-screen input can be saved into the instrument.

In step 214, under the overlay mode, the user can make any input on the touch screen either using a given stylus or by hand, depending on the design of the touch screen.

Likewise, in step 215 the user can at any time exit the overlay mode by pressing a button or virtual key designed for such function, or virtual key 109 again in this exemplary case. The touch-screen input will not be saved in this design, unless the save command or button 105 is pressed in step 218.

If the user needs to clear the display overlay, he can do so by pressing "clear" key 108 in this exemplary case in step 213.

At any moment, the user can press the "save key" (105 in FIG. 1) in step 218 to save/store the current on screen information, which include the touch-screen input, the specific timing and occasion of the waveform and the complete context of an inspection session into internal or external media (120).

Also worth noting in FIG. 2 is another feature conceived in the present invention shown in step 216, in which when the user presses one of the designated virtual keys or buttons, a popup question window shows up on the screen with a form specifically related to the context of the operation or inspection. For instance, the pop-up form may be to ask the user to categorize the severity of a particular defect as identified by a hand drawn circle with one of the three choices, namely low, medium or high. The nature and the format of information are more specific because it is related to the inspection concurrently performed. The content of the form preferably is determined by the context of the instant inspection event, such as a gate event when the signal has crossed a certain threshold. There can be a predetermined the number of forms corresponding to a number of inspection events.

It can be understood by those skilled in the art that the steps in FIG. 2, 211~217 are all independent operational steps determined by the operator as to when to initialize and when to end. They are not necessarily sequentially related.

When save button 105 is pressed, one important novel aspect of the present disclosure is that the instrument is further configured to "stack" together all the information entered in the process above and saved into memory 120. The "stacked" information may include any of the following: the inspection data captured either in step 206 or 220, the free form touch-screen input made in step 214, the popup information from step 217, the instrument setup (208), the inspection setup (209) and the subject information (210). The method to correlate all the saved information is further explained later in association with FIG. 4. The overlay-saving action collects together all the information related to a specific inspection event and makes it available in the instrument that maybe needed to analyze and/or process the inspection data.

It can be appreciated that the visual aspect of the entire screen display at the specific moment when the complete inspection context is saved with the corresponding touch-screen input provides convenience and valuable information for data analysis.

Figure 3:
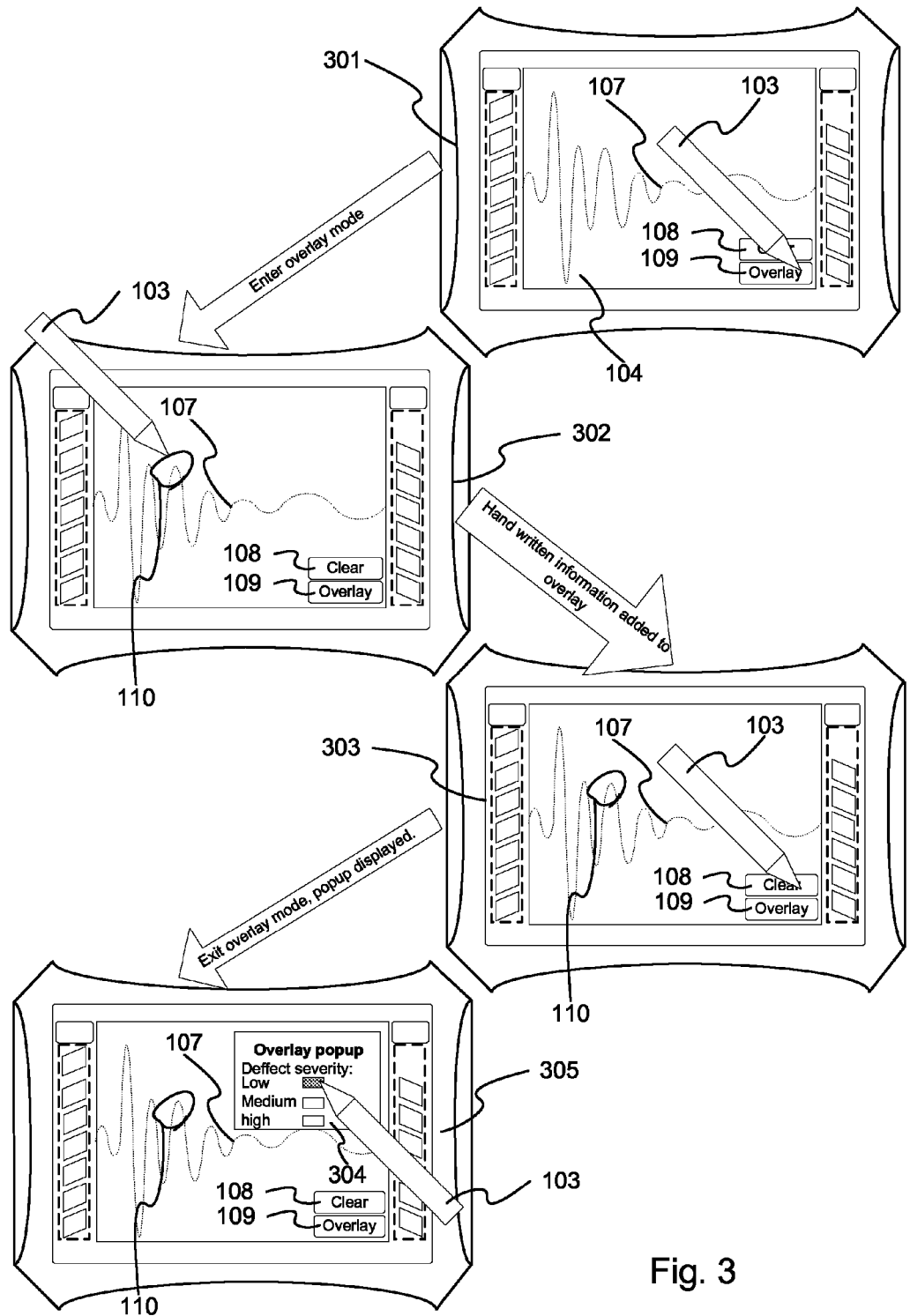
FIG. 3 is a schematic diagram showing an exemplary usage of the interface feature according to presently disclosed embodiment.

Reference is now made to FIG. 3, wherein a sample case of the invention with some exemplary look of the user interfaces embodied by the instrument of the present disclosure. As can be seen, in interface 301, the user presses "overlay" button to enter into overlay mode on the touch-screen, while looking at a digital display of the waveform shown on the screen. This corresponds to step 211 in FIG. 2. In interface 302, the user circles a spot with a flaw suspected using the touch-screen, which corresponds to step 214 in FIG. 2. In interface 303, the user presses virtual key again, in the exemplary design, to prompt a popup window 304 to invite user enter fixed-format information specifically related to what's circled in 110. This corresponds to steps 216 and 217 in FIG. 2.

Figure 4:
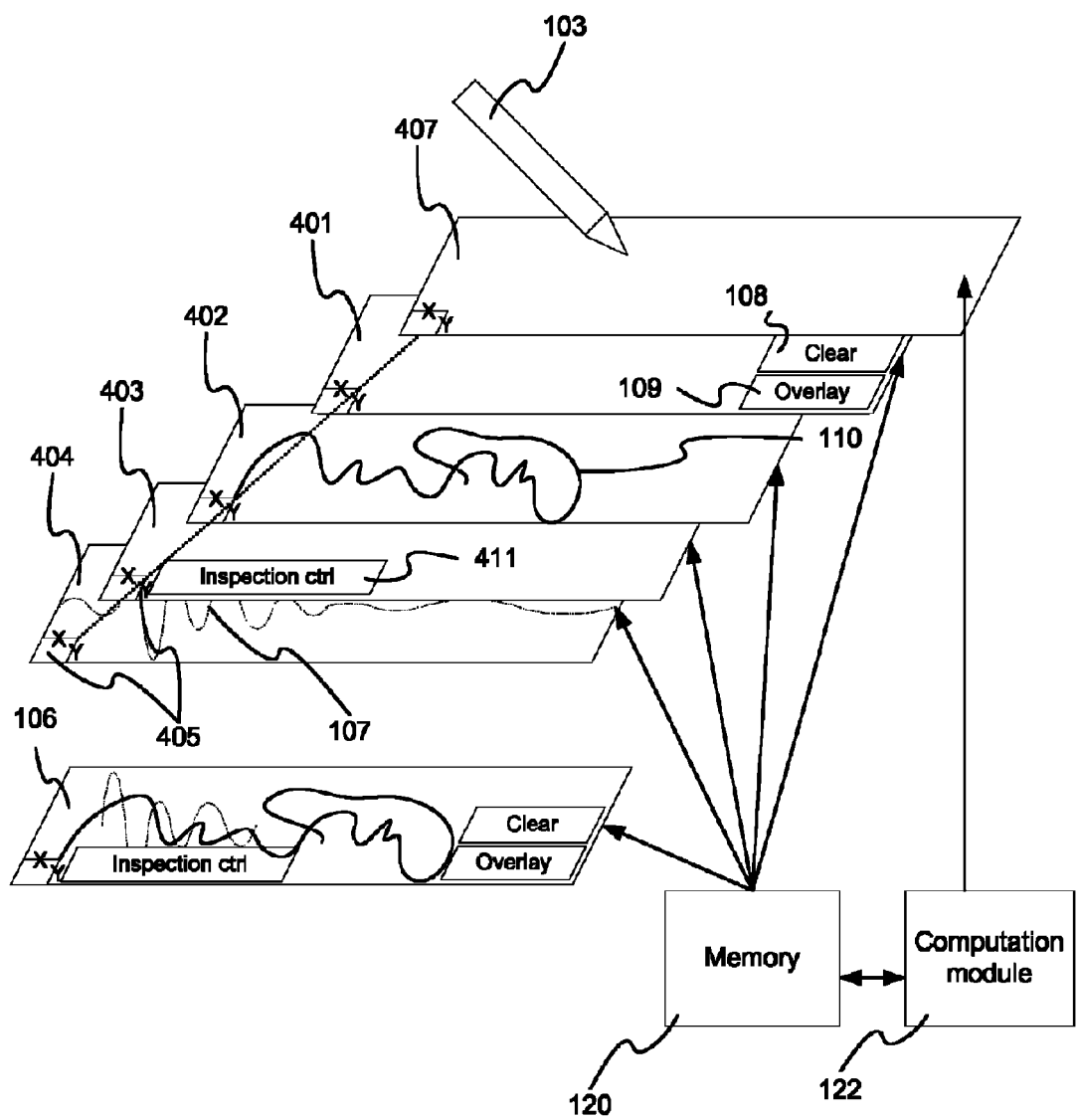
FIG. 4 is a schematic diagram showing the layers of information that are compounded during an exemplary overlaying process according to the presently disclosed embodiment.

Reference is now made to FIG. 4 which shows a representation of displayed layers of different kinds of information, their relationship and the method of correlating them, or the method of "overlaying" the layers.

It should be noted that what is displayed on screen display 104 does not necessarily have the same form in image processing in the instrument. In this example shown in FIG. 4, there are four visual components that are mixed together to produce what is effectively displayed on the screen. These components can be named "layers". Each layer contains information provided by a specific entity. In this example there is the "overlay control layer" 401, the touch-input layer 402, the "user interface layer" 403 and the "inspection data layer" 404.

The information in overlay control layer 401 shown as the most upper displayed layer in this example overwrites information from all other display layers when display layers are overlaid or mixed. This layer is also preferably used to display overlay virtual key 108.

Continuing with FIG. 4, touch-input layer 402 is the second most upper display layer in this example. It overwrites every other layer except the overlay control layer 401. It is important for the invention that this layer to be in the second most upper layers to allow the user to enter touch-screen information 409 over information already displayed.

User interface layer 403 is the display layer used to display and receive control command for inspection controls 411 which can include any information to be used by the user to interact with instrument 101. Interaction includes modification of the instrument setup or any other setup except overlay control. It is also the layer on which information other than the "inspection data" is displayed. This information could be the date, time, battery level, menus, etc.

Inspection data layer 404 is the display layer on which digitalized inspection information 107 is displayed. It is the lowest or deepest display layer; therefore display on this layer 404 that overlaps displays on any other layer will be overwritten. Preferably, a special section of the screen is reserved for information from this display layer to make sure no inspection data is erased or over-written.

Still referring to FIG. 4, all the layers shown, or any combination of any number of layers shown can be mixed or overlaid together to produce what is displayed on the screen 104. Many commercially available tools for overlaying or mixing the above can be used. It can be appreciated that no matter what kind of mixing tools are used for the purpose of overlaying the above layers, the methods or technique all fall with the scope of the present disclosure.

The instrument of the present disclosure also embodies a layer of touch or pressure sensitive material shown as 407. Layer 407 is not a display layer which is controlled by mostly software modules or coding. This is a physical layer comprised of touch sensitive material and translating touch trajectory to electronic signals to the instrument, which is displayed in layer overlay 402.

One important aspect shown in FIG. 4 is a common coordinate 405 shared by all the layers discussed above. Common positioning and sizing shared by all layers are controlled by this common coordinate 405, which is important to make sure information across all layers match geometrically.

Yet one more important aspect of the present disclosure shown in FIG. 4 is that each "layer" except touch sensitive material also represents a coding sub-module or sub-block that constitutes a part of computational module 122 of FIG. 1, which is executed by digital data processor 116 that's normally used by typical NDT instrument.

As can be seen, the resultive display 106 compounded all the layers as described above.

Figure 5A:
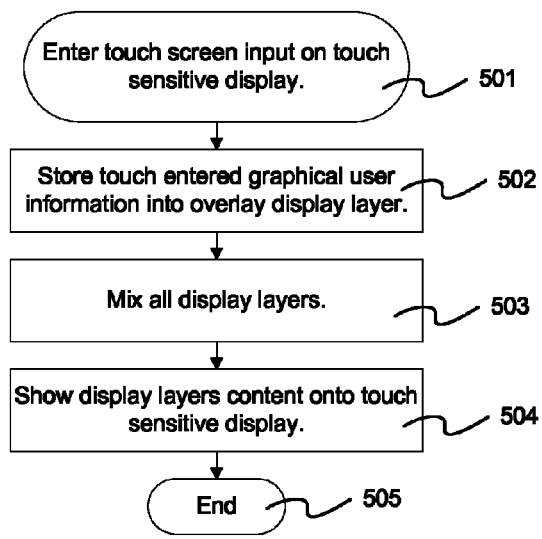
FIGS. 5a, 5b and 5c are exhibition of steps or process executed during some exemplary operations using the instrument devised with the presently disclosed embodiment.
Figure 5B:
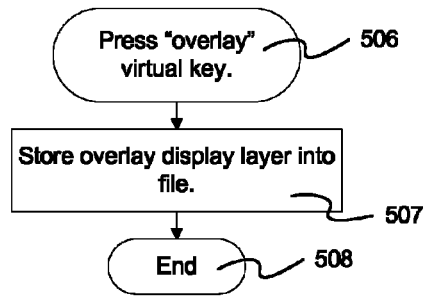
Figure 5C:
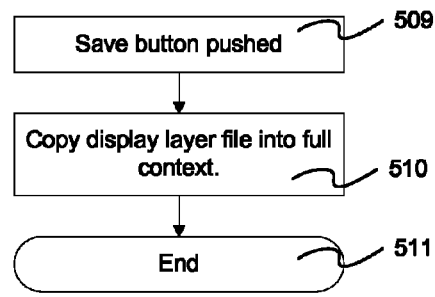

Reference is now made to FIGS. 5a, 5b and 5c, with continuous reference back to FIGS. 1, 2 and 4. FIG. 5 show some flowcharts describing the steps of processing display layers or the relationships among the coding modules represented by their corresponding layers during some simple but common use cases embodying the present invention.

Steps 501 to 505 elaborate step of 214 in FIG. 2 for entering touch screen input on touch sensitive display. In steps 501 and 502, the user enters information on touch sensitive display layer 407 at a precise position in coordinate 405 and stores such information in memory space 120. In step 502, computational module 122 calculates coordinate information and set information at this coordinates into overlay display layer 402. In step 503, computational module 122 mixes together overlay control layer 401, touch-input layer 402, user interface layer 403 and inspection data layer 404. In step 504 result of mixing all display layers memory spaces is processed by computational module 122 and displayed on the graphical touch sensitive display 106.

Referring to FIG. 5b, steps 506 to 508 elaborate step 215 in FIG. 2 for executing event when overlay virtual key is pressed. In step 507 touch-input layer 402 information is stored in a display overlay file in memory 120 of FIG. 1 for later use.

Referring to FIG. 5c, steps 509 to 511 elaborate step 218 for executing the event when save button is activated. In step 510 display overlay file in FIG. 5b is copied into a full context 305 as shown in FIG. 3.

It is to be understood that embodiments of the invention may be embodied as a software or firmware program, as software and hardware, or as hardware and/or circuitry alone. The features disclosed and explained herein may be employed in any computerized devices and software systems for non-destructive devices.

Although the present invention has been described in relation to particular exemplary embodiments thereof, many other variations and modifications and other uses will become apparent to those skilled in the art. It is preferred, therefore, that the present invention not be limited by the specific disclosure.

What is claimed is:

1. A non-destructive inspection and testing (NDI/NDT) instrument for inspecting or measuring a test object, comprising:
   a probe configured to launch inspection signals to a test object, to receive returning signals and to produce an analog response representative of the returning signals;
   a signal processor configured to process the analog response into inspection digital data representing inspection results corresponding to the returning signals and to prepare the digital data for display;
   a user interface configured to display the digital data as digital data display;
   wherein the user interface is touch sensitive for receiving touch-input made by physical contact in free-form, or in a pre-fixed form,
   a computational module coupled to the processor configured to overlay the touch-input with the digital data display and to produce overlaid information and overlaid display, wherein the overlaid information containing the touch-screen input further comprising an inspection context, which includes a predetermined inspection setup and the characteristics of the inspection results acquired at the moment when the touch-screen input is associated with, and,
   wherein the digital data display is time specific and includes the inspection conditions related to the inspection context and wherein the overlaid information is specific to inspection time and the context, and,
   a memory coupled with the processor to store the overlaid information and to provide the overlaid information for further analysis.

2. The NDT/NDI instrument of claim 1, in which the digital data display is of graphical format.

3. The NDT/NDI instrument of claim 1, in which the digital data display includes text or numeral format.

4. The NDT/NDI instrument of claim 1, in which the digital data display may include one or more of the following in the test object: a) defect, b) flaw, c) corrosion, d) geometric measurement.

5. The NDT/NDI instrument of claim 1, in which the touch-input is made by free-form input drawn upon the user interface.

6. The NDT/NDI instrument of claim 1, in which the touch-input includes fixed-format input for which a predetermined form is prompted and shown on the display corresponding to specific characteristic of the inspection digital data.

7. The NDT/NDI instrument of claim 1, in which the touch-input is made by a pen-like tool allowing for an operator hold and apply pointed touch or pressure upon the user interface.

8. The NDT/NDI instrument of claim 1, in which the computation module includes a commercially available overlaying tool.

9. The NDT/NDI instrument of claim 1, in which the computation module comprises the following layers of sub-modules:
   a. an overlay control layer for displaying overlay related function keys and;
   b. a touch-input display layer for further displaying touch-input information which is configured to be overlaid and recorded into the memory;
   c. a user interface layer for displaying and providing access to conventional inspection controls;
   d. an inspection data layer for displaying digitalized inspection information.

10. The NDT/NDI instrument of claim 9 wherein all the layers of sub-modules use one common coordinate such that the positioning and sizing in all the layers of sub-modules is conducted in unison.

11. The NDT/NDI instrument of claim 9 wherein the display controlled by inspection data layer can be over-written by the sub-modules in the user interface layer, the touch-input layer and the overlay control layer; the display controlled by the user interface layer can be over-written by the sub-modules in the touch-input layer and the overlay control layer; and the display by the touch-input processing layer can be over-written by the overlay control layer.

12. The NDT/NDI instrument of claim 9 wherein the overlay command is accessible by a virtual key or a button on the instrument.

13. A method of overlaying touch-screen input with digital inspection display for a non-destructive inspection and testing (NDI/NDT) instrument, wherein the instrument including a touch-screen on which the inspection display is displayed, and the inspection display including graphical inspection result and context of inspection specifications, the method comprising the steps of,
   setting up the inspection with conditions including the context of inspection specifications,
   conducting inspection and receiving inspection signals indicating the inspection result,
   providing touch-input information at a moment during the inspection,
   receiving touch-input information sensed from the touch-screen,
   and overlaying the touch-input information with the inspection display,
   wherein the overlaid information containing the touch-screen input further comprising an inspection context, which includes a predetermined inspection setup and the characteristics of the inspection result acquired at the moment when the touch-screen input is associated with, and,
   wherein the digital data display is time-specific and includes the inspection conditions related to the inspection context, and wherein the overlaid information is specific to inspection time and the context.

14. The method of claim 13 wherein, the inspection display is acquired and digitized into digital inspection data and displayed at a display rate; wherein the touch-input is made when the display of the digital data is paused at a pause moment and the touch-input information is overlaid with the inspection data and the context corresponding to the pause moment.

15. The method of claim 13 further including a step of producing a fixed form display on the touch-screen, the fixed form is corresponding to the inspection data at the pause moment that allows user to enter touch-input information within the fixed form.

* * * * *